United States Patent
Bui

(10) Patent No.: US 11,002,307 B2
(45) Date of Patent: May 11, 2021

(54) CONNECTING ARRANGEMENT BETWEEN JOINT PARTNERS IN THE CHASSIS REGION OF A VEHICLE THAT CAN BE BRACED SEPARABLY AGAINST ONE ANOTHER

(71) Applicant: Bayerische Motoren Werke Aktiengesellschaft, Munich (DE)

(72) Inventor: Hoang Viet Bui, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 938 days.

(21) Appl. No.: 15/679,358

(22) Filed: Aug. 17, 2017

(65) Prior Publication Data

US 2017/0343031 A1    Nov. 30, 2017

Related U.S. Application Data

(63) Continuation-in-part of application No. PCT/EP2016/053064, filed on Feb. 12, 2016.

(30) Foreign Application Priority Data

| Feb. 18, 2015 | (DE) | 10 2015 202 938.7 |
| Jul. 10, 2015 | (DE) | 10 2015 212 965.9 |
| Jul. 28, 2015 | (DE) | 10 2015 214 294.9 |

(51) Int. Cl.
*F16B 35/00* (2006.01)
*F16B 2/00* (2006.01)
(Continued)

(52) U.S. Cl.
CPC ............... *F16B 35/00* (2013.01); *C23C 4/10* (2013.01); *C23C 4/134* (2016.01); *C23C 24/04* (2013.01);
(Continued)

(58) Field of Classification Search
CPC ...... F16B 2/005; B29C 66/71; B29C 66/7212
See application file for complete search history.

(56) References Cited

U.S. PATENT DOCUMENTS 3,048,482 A * 8/1962 Hurst ..................... B24D 13/14
51/298
3,279,972 A * 10/1966 Thassy .................. B21D 39/03
428/223
(Continued)

FOREIGN PATENT DOCUMENTS

| CN | 101449047 A | 6/2009 |
| CN | 101555938 A | 10/2009 |

(Continued)

OTHER PUBLICATIONS

Chinese-language Office Action issued in counterpart Chinese Application No. 201680009835.0 dated Jun. 4, 2019 with English translation (18 pages).
(Continued)

*Primary Examiner* — Daniel J Wiley
(74) *Attorney, Agent, or Firm* — Crowell & Moring LLP

(57) ABSTRACT

A connecting arrangement is provided between joining partners which are braced separably against each other in the chassis region of a vehicle, wherein the joining partners are braced against each other via their contact surfaces by at least one releasable fastening element. Hard particles are applied to the contact surface at least of one of the joining partners before the production of the connecting arrangement and therefore before the bracing mounting of the joining partners and of the fastening element. The hard particles at least partially project into the respectively other contact surface as a result of the bracing mounting. The hard particles are applied so as to be at least approximately abrasion-proof, for example by a blasting process.

17 Claims, 1 Drawing Sheet

(51) Int. Cl.
| | |
|---|---|
| *C23C 4/10* | (2016.01) |
| *C23C 4/134* | (2016.01) |
| *C23C 24/04* | (2006.01) |
| *B60B 27/00* | (2006.01) |
| *B60B 35/00* | (2006.01) |
| *B60G 7/00* | (2006.01) |
| *B62D 7/00* | (2006.01) |
| *B62D 24/04* | (2006.01) |
| *C09D 5/44* | (2006.01) |

(52) U.S. Cl.
CPC .......... *F16B 2/005* (2013.01); *B60B 27/0052* (2013.01); *B60B 27/0063* (2013.01); *B60B 27/0078* (2013.01); *B60B 35/006* (2013.01); *B60B 35/007* (2013.01); *B60G 7/005* (2013.01); *B60G 7/008* (2013.01); *B62D 7/00* (2013.01); *B62D 24/04* (2013.01); *C09D 5/4488* (2013.01)

(56) References Cited

U.S. PATENT DOCUMENTS

| | | | | |
|---|---|---|---|---|
| 3,692,341 | A * | 9/1972 | Brown | F16B 5/02 403/408.1 |
| 4,560,607 | A * | 12/1985 | Sumner | B29C 37/0082 428/141 |
| 4,639,392 | A * | 1/1987 | Nels | B32B 5/16 442/378 |
| 4,662,972 | A * | 5/1987 | Thompson | B32B 13/10 114/263 |
| 5,259,280 | A * | 11/1993 | Hoy | B23P 5/00 76/116 |
| 5,487,803 | A * | 1/1996 | Sweeney | B29C 66/135 156/91 |
| 5,787,655 | A * | 8/1998 | Saylor, Jr. | A47G 27/0225 428/149 |
| 6,347,905 | B1 * | 2/2002 | Lukschandel | F16B 2/005 403/404 |
| 9,939,036 | B2 * | 4/2018 | McCord | F16D 69/026 |
| 9,951,427 | B2 * | 4/2018 | Horling | F16B 2/005 |
| 2003/0087097 | A1 * | 5/2003 | Lukschandel | F16B 2/005 428/408 |
| 2008/0308365 | A1 * | 12/2008 | Foge | F16D 69/025 188/251 A |
| 2011/0114908 | A1 | 5/2011 | Fargo et al. | |
| 2012/0319390 | A1 | 12/2012 | Burger et al. | |
| 2013/0322804 | A1 * | 12/2013 | von Schleinitz | F16B 2/005 384/548 |
| 2014/0186583 | A1 * | 7/2014 | Speth | C23C 16/325 428/144 |
| 2014/0334868 | A1 * | 11/2014 | Apfel | C08K 3/10 403/267 |
| 2015/0330424 | A1 * | 11/2015 | Arz | B29C 41/02 29/525.11 |

FOREIGN PATENT DOCUMENTS

| | | |
|---|---|---|
| CN | 102084017 A | 6/2011 |
| CN | 102887172 A | 1/2013 |
| CN | 103314058 A | 9/2013 |
| DE | 10 2008 017 029 A1 | 10/2009 |
| DE | 10 2008 036 796 A1 | 2/2010 |
| DE | 10 2008 055 706 A1 | 5/2010 |
| DE | 10 2011 005 921 A1 | 6/2012 |
| DE | 10 2014 000 975 A1 | 8/2014 |

OTHER PUBLICATIONS

German-language Search Report issued in counterpart German Application No. 10 2015 202 938.7 dated Oct. 27, 2015 with partial English translation (10 pages).

International Search Report (PCT/ISA/210) issued in PCT Application No. PCT/EP2016/053064 dated May 23, 2016 with English translation (8 pages).

German-language Written Opinion (PCT/ISA/237) issued in PCT Application No. PCT/EP2016/053064 dated May 23, 2016 (6 pages).

Chinese-language Office Action issued in counterpart Chinese Application No. 201680009835.0 dated Oct. 9, 2018 with English translation (11 pages).

* cited by examiner

CONNECTING ARRANGEMENT BETWEEN JOINT PARTNERS IN THE CHASSIS REGION OF A VEHICLE THAT CAN BE BRACED SEPARABLY AGAINST ONE ANOTHER

CROSS REFERENCE TO RELATED APPLICATIONS

This application is a continuation-in-part of PCT International Application No. PCT/EP2016/053064, filed Feb. 12, 2016, which claims priority under 35 U.S.C. § 119 from German Patent Applications Nos. 10 2015 202 938.7, filed Feb. 18, 2015, 10 2015 212 965.9, filed Jul. 10, 2015, and 10 2015 214 294.9, filed Jul. 28, 2015, the entire disclosures of which are herein expressly incorporated by references.

BACKGROUND AND SUMMARY OF THE INVENTION

The invention relates to a connecting arrangement between joining partners braced separably against each other in the chassis region of a vehicle, wherein the joining partners are braced against each other via their contact surfaces by at least one releasable fastening element.

As is known, in the chassis region of a vehicle, for example a passenger motor vehicle, there are a number of joining partners which are connected releasably to one another. One or more screws are customarily used here as the releasable fastening element, wherein a threaded pin and/or a screw nut, which is fitted onto a threaded portion which is provided on one of the joining partners, itself is also intended to fall under the term of screw. Depending on which structural elements are involved, relatively high forces also have to be transmitted via such a connecting arrangement.

For example, this is true of the screw connection of a wheel bearing to a wheel carrier (also called axle stub or pivot bearing) or of the connection between a wheel bearing and a brake disk, which is flange-mounted releasably thereon, or a customary brake disk chamber. Furthermore, during the driving mode of a vehicle, high forces are transmitted in the circumferential direction of a wheel of the vehicle, which is fastened to the brake disk or to the brake disk chamber or to a wheel bearing, and the joining partners thereof (of said releasable or separable connecting arrangement), namely to the brake disk or to the wheel bearing. The same applies in practice to the screw connection of a brake caliper or of other parts of the vehicle brake system to the wheel carrier, at any rate when the vehicle is braked. However, high forces are also transmitted via the releasable or separable connections between wheel-guiding links and the wheel carrier or if the latter is guided, for example, via a McPherson strut or another suspension strut, between the wheel carrier and a vibration damper, and also via a joint pin and/or a joint pin nut of a ball and socket joint or via a rubber bearing (customary in the chassis region) or the like, which, for example, connects a link to the wheel carrier. A releasable or separably braced connection between a wheel carrier and a vibration damper is customarily designed here as what is referred to as a clamping fit connection, wherein one of the joining partners is designed in the manner of a slotted hollow cylinder and engages around a portion, which is adapted thereto, of the other joining partner. The slot is clamped to a minimal size by generally a plurality of screws through suitably shaped webs of the hollow cylinder.

In the driving mode of the vehicle, transmission of high forces takes place in the chassis region of a vehicle, but also in the releasable connecting region between an axle support of the vehicle and structural elements fastened to said axle support. Such a structural element can be, for example, a flat structural part which is known to a person skilled in the art under the term "shear area". However, forces of a significant magnitude are also transmitted between a gearing or a steering mechanism, which is fastened to an axle support, and said axle support. Bearing clips via which, for example, a stabilizer is held on an axle support can also be exposed to relatively high forces, in the same manner as rubber bearings, which are defined in terms of their universality and via which a first structural element is mounted on a second structural element in the chassis region of a vehicle. The first structural element here can be, for example, a wheel-guiding link and the second structural element can once again be an axle support. However, a vibration absorber which is fastened to any other structural element in the chassis region may also be referred to as the first structural element.

As already mentioned, the releasable fastening elements mentioned are customarily screws which either have been screwed into a thread, introduced in a suitable manner into the respective counterpart or joining partner, or into a suitably arranged screw nut and have to be tightened here with such a high torque that the connecting arrangement between the joining partners is similarly rigid to a nonreleasable, for example, welded connection. For a wide variety of reasons, this is because even minor relative movements between the interconnected joining partners should still be avoided. It is namely functionally necessary, in each of the applications enumerated by way of example above, to provide a rigid support which in particular does not even allow any clicking noises to arise which result from micro movements or very small (micro) vibrations between said connected elements because of the forces or torques, which are to be transmitted in a wide variety of directions in the driving mode of the vehicle, between said joining partners or components. In addition to the noise problem, the reliable transmission of force or torque is a much more important aspect in the case of many components. Merely by way of example, this is true of a shear area which is mentioned and which provides an axle support with increased strength and rigidity by the individual supports thereof being supported in an improved manner against each other and therefore being of significant importance for the rigidity of the vehicle in its entirety. Such a connecting arrangement therefore also has to be configured to be maximally stiff, but this has hitherto been possible only with the aid of strong and large connecting screws, cf. also the following statements in this respect.

In conventional connecting arrangements, the problem may also occur that the releasable fastening elements, customarily a plurality of screws, are not capable of sufficiently withstanding an external shearing load. Such screw connections are customarily configured non-positively with regard to a shearing load, and therefore the resistance force to a shearing load is dependent on the pretensioning force of the screws and the coefficient of friction between connecting partners. In the case of a higher shearing load, the screws therefore have to be of a larger size for the same coefficients of friction. However, this cannot always be realized in a simple manner, but rather may necessitate extensive modifications in the region of the connecting arrangement, in particular also in respect of the construction space. Weight and costs would therefore also be greatly increased.

It is the object of the present invention to avoid this outlined problem, i.e., when a high or increased shearing load of the releasable fastening element is present, not to require a relatively great construction space for the releasable fastening element(s) or to demonstrate a (further) efficient measure, with the aid of which the outlined micro movements (possibly occurring during the driving mode of the vehicle) can be prevented in a connecting arrangement of the known type.

The achievement of this object is characterized in that hard particles are applied to the contact surface at least of one of the joining partners before the production of the connecting arrangement and, therefore, before the bracing mounting of the joining partners and of the fastening element. The hard particles at least partially project into the respectively other contact surface as a result of the bracing mounting. Advantageous embodiments and further developments are described herein. In particular, a method for producing such a connecting arrangement is therefore also provided.

According to the invention, the coefficient of friction between the contact surfaces, which are braced against each other, of the joining partners which are braced against each other by way of at least one releasable fastening element, is increased by what are referred to as hard particles being applied to at least one of said contact surfaces even before the connecting arrangement is assembled. The hard particles then at least partially dig into the respectively opposite contact surface during the assembly, i.e. during the bracing when mounting the joining partners and the fasteners.

In order to reduce or avoid any or even very small relative movements between said components or joining partners (the terms "joining partners" and "component" or "structural element" are used synonymously below without any differentiation being intended to thereby be expressed) in the connecting region according to the invention, the surface composition of at least one of said components or joining partners is therefore adapted in a specific manner by the application of hard particles to the, for example, contact surface such that the coefficient of friction between the contact surfaces is increased, specifically by an additional form-fitting connection. This is because, during the bracing of said components or joining partners against each other, the hard particles provided according to the invention furrow, as seen in the micro range, into the surface area structure of the respectively other component and virtually produce a microform-fitting connection.

It should be expressly emphasized here that at least one of the components braced against each other may be provided with a coating of any type. For example, at least one of the components may be lacquered—in vehicle manufacturing this customarily, as is known, involves a CDC coating. Such a coating should be understood as belonging to the "contact surface" for the correct interpretation of the patent claims. It can therefore be sufficient if the hard particles provided according to the invention are located only in the coating of one of the components or penetrate or project only into the coating of one of the components since, even by this means, an increase in the coefficient of friction between said components can be obtained. However, it can also be provided to dimension and apply the hard particles in such a manner—said application will be discussed in more detail at a later point—that said hard particles penetrate through said coating (for example the CDC layer) and at least slightly penetrate the actual surface area (per se and initially uncoated surface area) of the respective component.

The material used for the hard particles can be, for example, silicon carbide, wherein such hard particles (consisting of any suitable material) can have, for example, a size (approximately a diameter, wherein the hard particles are preferably not spherical, but rather have a multi-angled surface area with corners and points) of several (for example 1-70) micrometers. The preferably used hard particles are distinguished not only by particularly high hardness (of the material of the hard particles), but preferably also by extremely pronounced sharp edges, i.e. the surface area of said hard particles preferably has a multiplicity of edges and corners. It is known that, for example, silicon carbide can be applied to surface areas extremely durably by plasma technology, cf. what is referred to as the "plasma grip" technology of efc plasma GmbH, Ingolstadt. The hard particles are held here on the surface area coated by plasma technology using a nickel adhesion promoter layer. It should be expressly emphasized that, with the indication of this example, the present invention is not, however, in any way restricted to such hard particles; on the contrary, use can be made of diverse other materials and methods, by means of which sufficiently hard particles can be applied to a contact surface of a joining partner, wherein, during bracing of a surface area or contact surface of a first joining partner, which surface area or contact surface is coated with such particles, against a second joining partner composed, for example, of a (relatively softer) aluminum alloy, said hard particles at least partially penetrate into the surface area or contact surface thereof. A form-fitting connection is produced here by portions of the hard particles being pressed at least into the respective other component. The overall area over which the two components are connected to each other is furthermore increased by said hard particles, which brings about an additional increase in the frictional force acting between said components.

Of course, a layer of hard particles applied according to the invention is particularly effective if the hard particles have been applied to at least one of said surfaces or contact surfaces so as to be at least approximately abrasion-proof. This can be realized, for example, by the hard particles being applied by a blasting process, such as pressure blasting, injector blasting or plasma blasting. It is thus namely possible initially to apply the hard particles to the contact surface of the first joining partner with such a high pressure that portions of the hard particles penetrate therein and at the same time portions of the hard particles protrude out of the contact surface. If the first joining partner is then mounted on the second joining partner, with the bracing via the fastening elements or fastening screws, those parts of the hard particles which protrude out of the contact surface of the first joining partner penetrate into the material of the second joining partner that is, by contrast, possibly softer.

In this connection, reference should be expressly made to the method of the present invention, wherein, in principle, instead of a device, a method is provided where the hard particles are applied instead of the feature of the device where the hard particles have been applied.

As already explained further above, in the case of a connecting arrangement according to the invention, at least one of the joining partners or the contact surface thereof can have a coating, in particular a CDC coating (=cathodic dip coating). There are various possibilities here.

Thus, the first joining partner may have been coated or can be coated with hard particles while the second joining partner has a CDC coating. During the mounting of the connecting arrangement, i.e. during the assembly of said joining partners, the hard particles of the first joining partner can either penetrate only into the CDC coating of the second joining partner or can penetrate through the coating and can furthermore penetrate into the actual surface area (=that without a coating) of the second joining partner to a certain extent. In both cases, the hard particles produce a microform-fitting connection and, as a result thereof, the coefficient of friction between the joining partners is increased. Of course, this increase is particularly intensive in the case mentioned second above, namely when the hard particles penetrate through the coating and penetrate into the actual surface area of the second joining partner; however, for this purpose, the height of the hard particles protruding from the surface area of the first joining partner is intended to be greater than the thickness or height of the CDC coating of the second joining partner.

Alternatively, the hard particles can first of all be applied to the first joining partner, after which a further coating can also be applied to the surface provided to this extent (=joining surface) (a CDC coating is applied). In this case, the height of the hard particles protruding from the actual (initially uncoated) surface area of the first joining partner is preferably intended to be greater than the thickness or height of the coating so that the hard particles of the first joining partner can protrude out of the coating thereof and, when the joining partners are assembled, can at least slightly penetrate into the material of the second joining partner. As a result, a microform-fitting connection is also produced again here and the coefficient of friction between the joining partners is greatly increased, wherein such an effect also occurs to a reduced extent if the hard particles initially do not protrude significantly out of the surface area of the coated joining partner since, during the bracing of the two joining partners against each other, the coating is, as is known, slightly compressed (and therefore the applied layer is thinner).

As another alternative, the hard particles can be applied to the relevant surface of the first joining partner that is already provided with a coating (such as a CDC layer) before the joining partner is braced with the second joining partner. It is also intended to be ensured in this case that the hard particles protrude at least slightly out of the coating, but this can be adjusted in a specific manner by suitable application of the hard particles with consideration of the hardness of the actual surface area. However, even if the hard particles penetrate substantially completely into the coating, they can still deploy the effect during the bracing of the two joining partners since the thickness of the coating is actually slightly reduced by the bracing of the two components (joining partners) while the height of the hard particles does not undergo any change during the bracing of the joining partners.

Finally, there is also the possibility for the two joining partners to have been provided or to be provided with a coating. In this case, the hard particles should ideally be of a sufficient size in order to penetrate through both coatings and therefore be able to produce an (abovementioned) intensive microform-fitting connection; however, analogously to the above explanations, the hard particles can also act only in the coatings of the joining partners or else only in the coating of one of the two joining partners while they partially penetrate into the other joining partner. In each case, a desired increase in the coefficient of friction between the joining partners is achieved.

During the blasting, explained further above, or blasting application to one of the components, the hard particles can be applied to or introduced into the respective component in a targeted manner, by suitable control of the jet, at such a pulse that the hard particles penetrate at least approximately by half, with respect to their size, into the component and protrude at least approximately by half out of the relevant surface thereof (with or without a possible coating). A number of possible blasting processes have already been mentioned above here, by means of which hard particles can be applied, according to the invention, to at least one of the components or one of the joining partners. As far as the mentioned plasma blasting is concerned, use can advantageously be made, for example, of the plasma atmospheric pressure blasting process, the low pressure plasma blasting process or the vacuum plasma blasting process.

As far as a material for hard particles provided according to the invention is concerned, examples of suitable materials for this purpose, in addition to the silicon carbide which is already mentioned, are NiSiC (nickel-silicon-carbide) or a nickel diamond powder, and also steel, for example in the form of angular particles of stainless steel casting (called Cr grit), angular hard casting (with a martensitic structure) or corundum particles (of aluminum oxide with a portion of $SiO_2$). In principle, the hard particles can be applied to a harder material of one of the two components or joining partners and then penetrate into a softer material of the other component or joining partner during the bracing of the joining partners against each other, but such a material assignment or material combination is in no way obligatory. It has turned out in a series of tests that the abovementioned introduction of the hard particles into the joining partners, which are composed of a harder material, of a connecting arrangement according to the invention is favorable if the difference in hardness between the materials of the joining partners involved is relatively high. By contrast, if the difference in hardness between the materials of the joining partners involved is relatively small, better results have been obtained with a connecting arrangement according to the invention in which the hard particles are introduced into the joining partners consisting of the somewhat softer material (before the joining partners are joined together and braced against each other).

Preferably—but expressly not obligatorily—the hard particles can be applied to at least one of the surfaces so as to be at least approximately abrasion-proof, for example, as already mentioned, by means of a blasting process. However, in principle, it is also possible for such hard particles to be applied in an only slightly adhering manner to at least one of the surface areas, after which portions of the hard particles can dig simultaneously into the two surface areas during the bracing of the components against each other.

It has been shown in various series of tests that the desired effect of the hard particles according to the invention is reinforced as the mileage of a vehicle, of which chassis components are configured according to the invention, increases, i.e. the longer such a vehicle is operated, the better—at least as viewed over the first 50,000 km distance—is the intended effect, namely a reduction in the otherwise possibly occurring clicking or creaking noises and/or a measurable increase in the rigidity or strength (of the corresponding connecting arrangement). It has proven advantageous here if, in the case of a material pairing of high hardness, i.e. if the joining partners braced separably against each other are each composed of a relatively hard material (for example steel), hard particles with a size ("diameter") within the range of 10-30 micrometers (μm) are provided in a moderate extent, i.e. distributed with a surface portion of the order of magnitude of 10% over the (common) contact surface of the joining partner or the joining partners. If, by contrast, the joining partners for their part are each composed of a relatively soft material, such as, for example, an aluminum alloy, hard particles with a size ("diameter") within the range of 30-70 micrometers (μm) distributed with a higher surface portion of the order of magnitude of 20% of the common contact surface of the joining partner or joining partners have proven advantageous. And, if one of the joining partners is composed of a harder material and the other joining partner of a considerably softer material, hard particles with an average grain size of the order of magnitude of 20-40 µm which cover approximately 15% of the common contact surface are preferred.

In a departure from an embodiment mentioned above in which the hard particles are provided distributed substantially uniformly over the entire contact surface of one (or in the assembled state) of the two joining partners, it may also be advantageous, depending on the application, to distribute the hard particles non-uniformly over the contact surface. Whenever a plurality of fastening elements in the form of screws are provided penetrating the contact surfaces of the joining partners in bores customarily running perpendicularly thereto and, in the process, clamping the joining partners against each other, the hard particles have been applied to at least one of the contact surfaces (before the joining partners are joined together) only in the relatively close vicinity of the screws. In the direct vicinity of the screws, the highest surface pressure is present, as viewed over the entire contact surface, after the bracing of the joining partners against each other, and therefore, during the bracing of the joining partners, the hard particles are pressed in the best possible manner into the other joining partner in each case. With certain material pairings of the joining partners or in certain applications, i.e. when certain joining partners are connected to each other, it may be necessary, however, to brace the joining partners as strongly as possible against each other, for example for tightness reasons (namely, in order to prevent water molecules from penetrating into the joining gap), and therefore the hard particles are then intended to be located in the contact surface preferably away from the screws, i.e. excluding the relatively close vicinity of the screws.

A connecting arrangement according to the invention can be provided, for example or preferably, between one of the following pairings (and already mentioned by way of example at the beginning) of joining partners in the chassis region of a vehicle: (1) between a wheel bearing and a wheel carrier, axle stub or pivot bearing on which the wheel bearing is flange-mounted by means of screws; (2) between a brake disk or a brake disk chamber and the wheel bearing on which the brake disk or the like is flange-mounted by means of screws; (3) between a wheel of the vehicle and the brake disk or the brake disk chamber, on which the wheel is flange-mounted releasably by means of screws; (4) between a brake caliper or another structural element of the vehicle braking system, which is fastened to the wheel carrier or the like; (5) between a joint pin and/or a joint pin nut of a ball and socket joint which is fastened to the wheel carrier or the like and, for example, connects a wheel-guiding link to the wheel carrier; and (6) between a wheel-guiding link and a wheel carrier or between a vibration damper and the wheel carrier, wherein the connecting arrangement is customarily designed in the manner of a clamping fit connection, wherein one of the joining partners is designed in the manner of a slotted hollow cylinder and engages around a portion, which is adapted thereto, of the other joining partner, and wherein the slot is clamped to a minimal size by generally a plurality of screws which penetrate through suitably shaped webs of the hollow cylinder.

However, a connecting arrangement according to the invention can also be provided between a flat structural part or shear area and an axle support. Or, between a gearing or steering mechanism and an axle support. Or, between bearing clips for mounting a stabilizer and an axle support. Furthermore, in general, between a rubber bearing for mounting a first structural element on a second structural element in the chassis region of a vehicle, the chassis region being a particularly critical region of the entire vehicle because of the forces which occur and the functionally induced source of noises.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
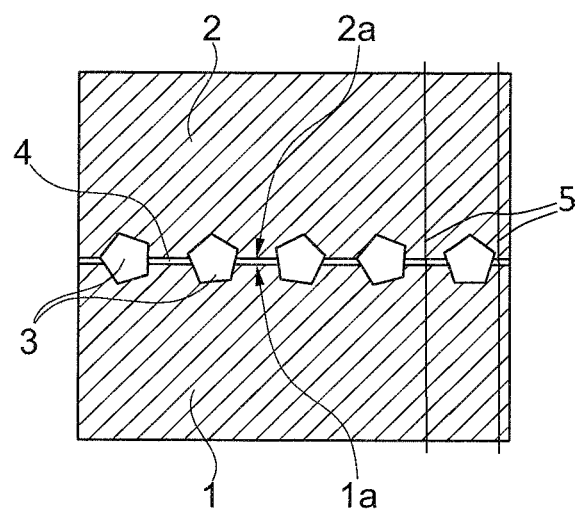
FIG. 1 is a schematic diagram of a section in a connecting region between first and second joining partners in order to illustrate, merely in principle, a connecting arrangement according to an embodiment of the invention.
Figure 2:
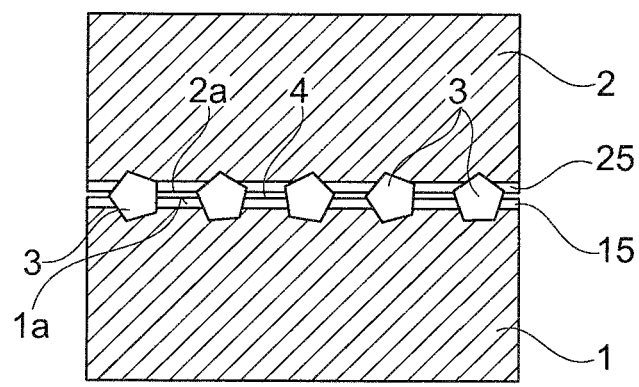
FIG. 2 is a schematic diagram of a section in a connecting region between first and second joining partners in order to illustrate, merely in principle, a connecting arrangement according to an embodiment of the invention.
Figure 3:
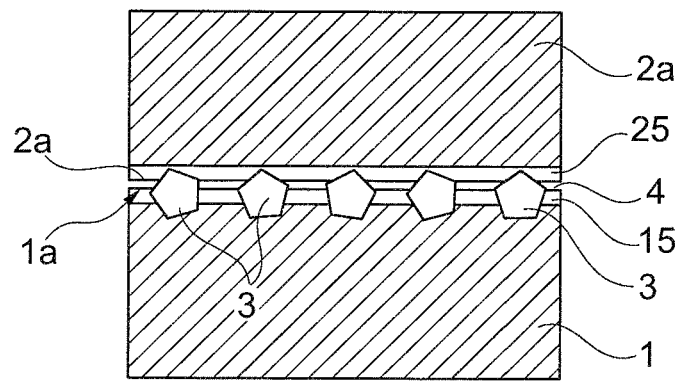
FIG. 3 is a schematic diagram of a section in a connecting region between first and second joining partners in order to illustrate, merely in principle, a connecting arrangement according to an embodiment of the invention.

The FIGS. 1-3 show, merely in principle, greatly enlarged cutouts of a section in the connecting region between a second joining partner 2 and a first joining partner 1 of a connecting arrangement according to the invention, wherein the second joining partner 2 rests with its contact surface 2a on the mating surface or contact surface 1a of the first joining partner 1. Shown only schematically by solid lines in FIG. 1 is a screw connection 5 by means of one or more screws as (a) releasable fastening element(s) via which the second joining partner 2, here in the manner of a flange connection, is braced against the first joining partner 1 and is held thereon. The screw or screws can lie within the contact surfaces 1a, 2a of the joining partners 1, 2 or else outside said contact surfaces 1a, 2a and customarily extend in suitable bores which are provided in the joining partners 1, 2 and the axes of which customarily run perpendicularly to the contact surfaces 1a, 2a in the same manner as the longitudinal axes of the screws. Depending on the individual configuration of the joining partners 1, 2, the joining partners 1, 2 can extend further beyond the actual contact surfaces 1a, 2a, as viewed in the direction of the plane of the contact surfaces 1a, 2a, but always rest on each other only by means of the contact surfaces 1a, 1b in the region thereof. The contact surfaces 1a, 2a in no way have to be level or flat here.

Before the production of the abovementioned screw connecting arrangement and therefore before the mounting of the second joining partner 2 on the first joining partner 1 or before the bracing of the joining partners 1, 2 against each other, hard particles 3 have been applied to the contact surface 1a of the first joining partner 1. The hard particles at least partially project into the mating surface or contact surface 2a of the second joining partner 2 by the bracing mounting, as all of the figures show.

In all of the figures, the hard particles 3 are also held on the contact surface 1a via a nickel adhesion promoter layer 4—because of said thin nickel adhesion promoter layer 4, a microgap illustrated significantly enlarged here is provided between the two components 1, 2. In reality, the microgap is virtually nonexistent or it can be reduced to almost zero. In particular, such an adhesion promoter layer does not have to be present; rather, it is an optional feature here.

According to FIG. 1, none of the joining partners 1, 2 has a further coating, while, according to FIGS. 2, 3, each joining partner 1, 2 is provided with a further coating 15 or 25 which can be, for example, a CDC coating. Both in FIG. 2 and in FIG. 3, the hard particles 3 with their (optional) adhesion promoter layer 4 have been applied to the joining partners 1, which are already provided with the coating 15. The difference between FIG. 2 and FIG. 3 consists in that, in FIG. 2, because of the bracing of the joining partners 1, 2 against each other, the hard particles 3 of the joining partner 1 penetrate through the coating 25 of the joining partner 2 while, in FIG. 3, the hard particles penetrate only into the coating 25 of the joining partner 2 without penetrating into the actual surface area thereof, i.e. the surface area without a coating 25. However, the effect according to the invention arises to a greater or lesser extent in all of the embodiments, in particular also in those which have only been described in words before the description of the figures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting arrangement between joining partners in a chassis region of a vehicle, the joining partners being bracable separably against one another, the connecting arrangement comprising:
    a first joining partner having a contact surface;
    a second joining partner having a contact surface;
    hard particles applied to the contact surface of at least of one of the first and second joining partners;
    at least one releasable fastening element by which the first and second joining partners are braced against each other via the respective contact surfaces, wherein
    the hard particles at least partially project into the other contact surface of the other one of the first and second joining partners via the bracing against one another by the releasable fastening element,
    at least one of the contact surfaces has a coating, and
    a thickness of the coating is smaller than a height of the hard particles protruding from the surface area of that contact surface to which the hard particles have been applied.

2. The connecting arrangement as claimed in claim 1, wherein
    the hard particles have been applied to at least one of the contact surfaces so as to be at least approximately abrasion-proof.

3. The connecting arrangement as claimed in claim 1, wherein
    the hard particles are particles with a size of 1-70 µm, a surface area of which has a multiplicity of corners and edges.

4. The connecting arrangement as claimed in claim 3, wherein
    the hard particles are composed of: a steel material, corundum, silicon carbide, or Ni—SiC in a form of a nickel-diamond coating.

5. The connecting arrangement as claimed in claim 1, wherein
    the hard particles are composed of: a steel material, corundum, silicon carbide, or Ni—SiC in a form of a nickel-diamond coating.

6. The connecting arrangement as claimed in claim 1, wherein
    when both the first and second joining partners are composed of a relatively hard material, the hard particles have a size within a range of 10-30 µm and are distributed with a surface portion of an order of magnitude of 10% over the contact surface.

7. The connecting arrangement as claimed in claim 1, wherein
    when both the first and second joining partners are composed of a relatively soft material, the hard particles have a size within a range of 30-70 µm and are distributed with a surface portion of an order of magnitude of 20% over the contact surface.

8. The connecting arrangement as claimed in claim 1, wherein
    when one of the first and second joining partners is composed of a harder material and the other of the first and second joining partners is composed of a softer material, the hard particles have an average grain size of an order of magnitude of 20-40 µm covering approximately 15% of the common contact surface.

9. The connecting arrangement as claimed in claim 1, wherein the coating is a CDC coating.

10. The connecting arrangement as claimed in claim 1, wherein the hard particles have been applied in a manner distributed over an entire contact surface.

11. The connecting arrangement as claimed in claim 1, wherein
    a plurality of releasable fastening elements are provided, the releasable fastening elements being screws which penetrate the contact surfaces of the first and second joining partners and clamp the contact surfaces against one another, and
    the hard particles are located with respect to the at least one of the contact surfaces either (1) only in relatively close surroundings of the screws, or (2) excluding the relatively close surroundings of the screws.

12. The connecting arrangement as claimed in claim 1, wherein the first and second joining partners are at least one of the following pairings:
    (1) wheel bearing on a wheel carrier;
    (2) wheel on the wheel bearing or on a brake disk chamber;
    (3) brake caliper or parts of a vehicle brake system on the wheel carrier
    (4) wheel-guiding link or vibration damper on the wheel carrier;
    (5) joint pin and/or joint pin nut of a ball and socket joint on the wheel carrier;
    (6) flat structural part in a form of a shear area on an axle support;
    (7) gearing or steering mechanism on an axle support;
    (8) bearing clips for mounting a stabilizer on an axle support; and
    (9) rubber bearing for mounting a first structural element on a second structural element.

13. A connecting arrangement between joining partners in a chassis region of a vehicle, the joining partners being bracable separably against one another, the connecting arrangement comprising:
    a first joining partner having a contact surface;

a second joining partner having a contact surface;

hard particles applied to the contact surface of at least of one of the first and second joining partners;

at least one releasable fastening element by which the first and second joining partners are braced against each other via the respective contact surfaces, wherein the hard particles at least partially project into the other contact surface of the other one of the first and second joining partners via the bracing against one another by the releasable fastening element, and the connecting arrangement is a clamping fit connection in which one of the first and second joining partners is a slotted hollow cylinder configured to engage around a portion of the other one of the first and second joining partners which is adapted thereto.

14. A method of producing a connecting arrangement between first and second joining partners in a chassis region of a vehicle, the method comprising the acts of:

applying hard particles to a contact surface of at least one of the first and second joining partners before producing the connecting arrangement; and bracing the first and second joining partners against each other via their contact surfaces by way of at least one releasable fastening element, wherein said hard particles at least partially project into the contact surface of the other of the first and second joining partners as a result of the bracing, wherein the hard particles are applied to the at least one contact surface via a blasting process such that portions of the hard particles penetrate the respective joining partner and portions project out of the contact surface of the respective joining partner.

15. The method as claimed in claim 14, wherein the blasting process is one of: a pressure blasting process, an injector blasting process, or a plasma blasting process.

16. The method as claimed in claim 14, further comprising the act of:

applying a coating on at least one of the contact surfaces of the first and second joining partners.

17. A method of producing a connecting arrangement between first and second joining partners in a chassis region of a vehicle, the method comprising the acts of:

applying hard particles to a contact surface of at least one of the first and second joining partners before producing the connecting arrangement; and bracing the first and second joining partners against each other via their contact surfaces by way of at least one releasable fastening element, wherein said hard particles at least partially project into the contact surface of the other of the first and second joining partners as a result of the bracing, wherein the hard particles are applied to the at least one contact surface such that the hard particles penetrate, at least approximately by half with respect to their overall dimension, into the first joining partner and project, at least approximately by half with respect to their overall dimension, out of the contact surface of the first joining partner.

* * * * *